Nov. 9, 1948.    O. L. POLLY    2,453,588
PURIFICATION OF ORGANIC ACIDS
Filed May 2, 1945
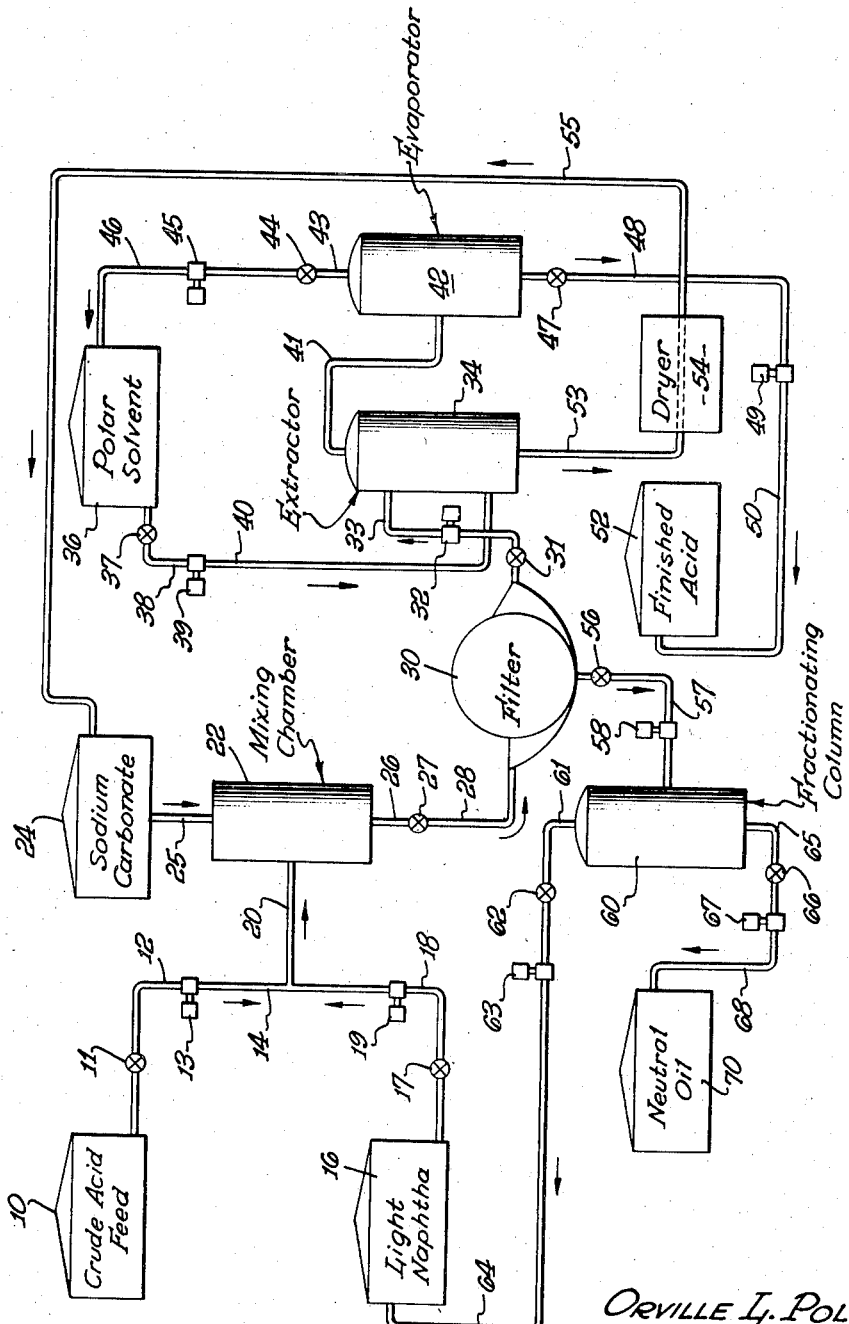
ORVILLE L. POLLY,
INVENTOR.
BY Ross J. Garofalo
ATTORNEY.

Patented Nov. 9, 1948

2,453,588

UNITED STATES PATENT OFFICE 2,453,588

PURIFICATION OF ORGANIC ACIDS

Orville L. Polly, Long Beach, Calif., assignor to Union Oil Company of California, Los Angeles, Calif., a corporation of California Application May 2, 1945, Serial No. 591,579

6 Claims. (Cl. 260—419)

This invention is related to a method of purifying organic acids, and more particularly the invention relates to the separation of neutral components from organic acids of comparative molecular weights.

In any process for the preparation of organic acids such as fat splitting, oxidation of waxes, oxidation of petroleum naphthas, sulfonation of mineral oils and the like, neutral constituents remain with the acids which are very difficult to separate therefrom. For example in the process of fat splitting, hydrocarbons are formed through the mechanism of decarboxylation. Similarly in the oxidation of waxes or petroleum naphthas, neutral oils such as paraffins, naphthenes, esters, and the like remain with the acid and are difficult to separate from the acids.

There are a number of ways for recovering organic acids from mixtures thereof with neutral components, which are familiar in the art. In general these methods consist in treating the crude acids with an aqueous solution of a caustic alkali such as sodium or potassium hydroxide or with an aqueous solution of sodium carbonate in which the organic acids combine with the alkali to form water soluble soaps which enter the aqueous phase.

Stratification is then induced either by settling alone or in the presence of emulsion breakers accompanied by heating. The aqueous phase is separated and acidified whereupon the soaps are decomposed and the free acids separate out as a distinct phase which may then be separated and dried. Such extraction methods with caustic alkali or alkali carbonates have several disadvantages, the correction of these being the primary object of the present invention.

Thus, in order to set free the organic acids from the water soluble soap solution, a sufficient quantity of mineral acid is employed to decompose the soap and in addition to neutralize the excess alkali present. In this method neither the alkali employed for extracting the soaps nor the acid used in their decomposition are economically recoverable, but on the contrary are converted into useless salt solutions which may present a serious problem of disposal.

Another major disadvantage of this method of purification lies in its ineffectiveness in separating certain neutral constituents from the acids. In many cases very stable emulsions or possibly gels are formed within the mixture upon the addition of the aqueous alkali, caustic or carbonate which gives rise to the retention in the acid phase of a large percentage of the neutral components originally present. Upon subsequent decomposition of the alkali soaps to produce the acids these neutral constituents remain as impurities therein.

An object of this invention is to separate organic acids such as the carboxylic acids, dicarboxylic acids, hydroxy acids, sulfonic acids, and the like of more than 8 carbon atoms from neutral materials of similar molecular weight, in such a manner that the reagents used in the separation may be economically recovered and reused in subsequent separations.

More specifically it is the particular object of my invention to purify organic acids, that is to remove neutral components therefrom by a process which is more effective than those heretofore employed.

Other objects and advantages of my invention will become apparent to those skilled in the art as the description thereof proceeds.

In general, application of the invention comprises treatment of crude organic acids, in the presence of a relatively non-polar anhydrous solvent, with an anhydrous metal carbonate, preferably an alkali carbonate such as sodium carbonate. This treatment results in the formation of a filterable complex between the acids and the sodium carbonate which after separation from the non-polar solvent in which the neutral oils remain may be decomposed to give purified acid and sodium carbonate. This separation of the sodium carbonate-acid complex is preferably affected by simple extraction with a low molecular weight polar solvent wherein the acids are recovered in the solvent phase as the extract and the sodium carbonate is recovered as a residue. This sodium carbonate may be subsequently dried and returned to the initial stages of the process and the acids are recovered by simple evaporation of the solvent therefrom.

In view of the foregoing explanation it is apparent that treatment with the anhydrous metal salt, in order to form the filterable complex, will be effected in the absence of water since obviously in the presence of water soap formation will result.

Other methods may be employed for separating the acid from the carbonate complex depending upon the end products desired. Thus to form a pure soap the complex may be boiled in the presence of water effecting the decomposition of the carbonate or alternatively, and again if it is not desired to recover the carbonate for further usage, the complex may be treated with dilute mineral acid to effect the decomposition thereof. In any of these methods of recovering the acid, the primary feature of my invention, that is, the efficient separation of the acid from the neutral oils, is still accomplished.

Other anhydrous metal salts may be employed in the formation of the acid complex, and in this regard it is important to point out the distinction between this complex as formed in the process of my invention and a soap which is formed with the acid in the conventional purification process. The distinction lies in the ability to recover from the complex formed as herein disclosed the original constituents of the complex. That is, by simple process of extraction disclosed more fully hereinafter, the metal salt may be separated from the acid-salt complex, whereas, such separation of a soap into the free acid and metal salt is impossible. With this distinction in mind it is within the scope of my invention to employ those metal salts which are capable of forming recoverable complexes with the acid, the term recoverable in this sense implying recovery by simple extraction rather than by decomposition and subsequent resynthesis of the salt. The carbonates, phosphates and borates of the alkali metals including sodium and potassium, the alkaline earth metals including calcium, barium, strontium, magnesium, the rare earth metals such as scandium, yttrium, lanthanum, cerium and the like and the heavy metals such as titanium, vanadium, lead, manganese, iron, cobalt, and the like conform to the above established limitations, whereas such compounds as the metal hydroxides will be seen to fall outside of this limitation because of the formation of soaps between the hydroxides and the acids.

For the purposes of the present invention the alkali carbonates and particularly sodium and potassium carbonates are the preferred salts for the formation of these complexes for the reasons that they may be had as granular, anhydrous, non-hygroscopic solids and that they more readily form complexes which are very easily recovered and they do not remain absorbed in the acids when the latter are recovered from the complex. It is to be understood that whereas my invention is limited to the use of salts which form recoverable complexes with the acids, the process is not limited to such recovery inasmuch as I have disclosed above that if desired, the complexes may be readily decomposed, or may be converted into the corresponding soaps by simple means.

In the separation of the acid-salt complexes from the non-polar solvent in which the neutral oil (non-acidic organic material) remains, any desired method may be employed. I have found, however, that this separation may be effected by ordinary filtration, and further that the mixture is rendered more susceptible to filtration if the temperature thereof is reduced below room temperature such as for example 32° F. or lower. On the other hand filtration at more normal temperatures such as from about 70° F. to 100° F. may be employed or the mixture may even be heated prior to filtration and in either case a filter aid such as asbestos, clay, or the like may be used if desired.

The process of my invention may be more readily understood by reference to the accompanying schematic drawing of one modification thereof. In the drawing, liquid acid such as oxidized wax is withdrawn from storage tank 10 through line 12 controlled by valve 11 and pumped by pump 13 into line 14 wherein it is mixed with a non-polar anhydrous solvent such as light naphtha withdrawn from storage tank 16 passing through line 18 controlled by valve 17 and pumped by pump 19 into line 14 from whence the acid naphtha mixture passes via line 20 into mixing chamber 22. The intermingling of the crude acid and light naphtha prior to introduction into the mixing chamber 22 is not necessary inasmuch as they may be separately fed into the chamber. The desired metal salt such as sodium carbonate is withdrawn from storage vessel 24 by any suitable means such as a screw, belt or bucket conveyor or gravity flow or the like and is passed through line 25 into mixing chamber 22 wherein the metal salt is intimately mixed with the acid solvent solution forming therein a salt-acid complex. The slurry of complex, excess salt which may be present, naphtha solvent and neutral oils is withdrawn from mixing chamber 22 via line 26 controlled by valve 27 and is passed via line 28 into filter 30. This filter may be any conventional type such as a rotary filter as exemplified in the drawing. The filtrate from this filtration comprising the non-polar solvent, in this case light naphtha, and the neutral oils, is withdrawn from filter 30 via line 57 controlled by valve 56 and is pumped by pump 58 into fractionating column 60 wherein the light naphtha is fractionated from the neutral oil as an overhead distillate passing from fractionating column 60 through line 61 controlled by valve 62 and is pumped by pump 63 through line 64 back to the naphtha storage tank 16. The neutral oils or bottoms from this distillation are withdrawn from fractionating column 60 via line 65 controlled by valve 66 and are pumped by pump 67 via line 68 into the neutral oil storage tank 70.

The residue from the filtration comprising the metal carbonate-acid complex and any excess carbonate which may be present may be washed with additional quantities of naphtha solvent if desired and in any case is withdrawn from filter 30 controlled by valve 31 and is pumped by pump 32 through line 33 into extractor 34. The polar extractive solvent is withdrawn from storage tank 36 via line 38 controlled by valve 37 and is pumped by means of pump 39 through line 40 into the extractor 34. As shown in the drawing countercurrent extraction is carried out in extractor 34 wherein the solvent acid extract passes upwardly therein and the metal carbonate residue passes downwardly therein. It is to be understood that any method of extraction may be employed such as batchwise extraction, concurrent extraction and countercurrent extraction, indicated in the diagram for the reason that such is probably the most economically feasible. The solvent acid extract is withdrawn from the top of the extractor 34 and passes via line 41 into evaporator 42 where the solvent is evaporated from the extracted purified acid passing overhead from the evaporator via line 43 controlled by valve 44 and is pumped by pump 45 through line 46 back to the polar solvent storage tank 36. The purified acid is withdrawn from evaporator 42 passing through line 48 controlled by valve 47 and is pumped by pump 49 through line 50 into the finished acid storage tank 52. It may be necessary in certain cases to heat these transfer lines in order to maintain the acids in the liquid state.

Returning to the extractor 34 the metal carbonate is withdrawn therefrom through line 53 and is passed through drier 54 to remove any residual solvent remaining therein and from drier 54 is returned via line 55 to metal carbonate storage tank 24.

For the extraction of the acid-metal carbonate complex any desired polar solvent may be employed such as alcohols, ketones, ethers and the like. It should be pointed out that it is necessary for these solvents to boil below the decomposition point of the acid or acids to be purified inasmuch as the separation of the solvent from the acid or acids is accomplished by evaporation of the former. Further than this the low molecular weight and therefore low boiling point solvents are prefered on the basis of the heat requirements necessary for the evaporation thereof from the acid. The criterion therefore upon which the choice of solvent is based is that its boiling point and therefore the temperature at which it can be separated from the extracted acids is below the point at which carbon dioxide is liberated indicating the decomposition of the acid. In this regard when dealing with complex easily decomposable acids I prefer to use those alcohols, ketones and ethers which boil in the range of 60° C. to 150° C. and preferably in the range of 80° C. to 100° C.

However, if stable acids are to be purified higher boiling polar solvent may be employed if desired, inasmuch as their evaporation from the acid will not effect the decomposition thereof. The choice of polar solvent therefore is a function of the particular acid or mixture of acids to be separated and is not limiting to the process of my invention.

The primary advantage of my invention lies not in the recovery of the metal salt employed inasmuch, as pointed out above, its recovery is not an essential element of my invention, but rather in an extremely high degree of purification obtainable. This is exemplified in the following example wherein crude acids containing as high as 50% of neutral contaminates have been separated, the recovered acids containing less than ½% of neutral contaminants. This degree of purification has been ascertained by extracting purified acid in a silica gel adsorption column wherein pure acids are preferentially absorbed by the silica, the neutral oils passing through the column. For this type of separation silica gel appears to be far superior to any of a number of clays also used. Further than this it will be noted that even in those cases in which as high as 50% of neutral material is contained in the crude acid that the recovery of the acid is extremely high. In this regard we have found that the ratio of acid in the neutralized phase to that in the carbonate phase may be as low as only 1 to 22, this being an exceptionally favorable partition factor.

The following example will serve to illustrate the process and advantages of my invention:

*Example*

A sample of 145° F. melting point refined paraffin wax was oxidized by air blowing at a temperature of 250° F. to an acid number of 94. One volume of this oxidized wax was then neutralized with 30 volumes of aqueous sodium carbonate of between 2 and 3 percent concentration. The aqueous system was subsequently extracted with hexane and finally with ether until no more extract was obtained. This required about 50 volumes of solvent. The total extract representing a part of the non-acidic materials in the oxidized wax amounted to 8.5 percent of the original wax oxidate and had an acid number of zero. The acids recovered from the soaps by decomposition with dilute mineral acids had an acid number of 138.

In the purification by the method of the present invention one volume of the same sample of oxidized wax having an acid number of 94 was dissolved in 40 volumes of hexane and this solution was agitated with three-fourths part per weight of anhydrous sodium carbonate, based on the weight of oxidized wax employed, for several hours. The slurry was then filtered and the residue representing the acid carbonate complex was agitated a second time with 13 volumes of hexane. This slurry was again filtered and evaporation of the 53 volumes of extract liquor gave 48.5 percent of neutrals, based on the wax oxidate feed, of 6.0 acid number. The acid-carbonate complex was decomposed with dilute mineral acid to obtain the organic acids which had an acid number of 156.

Similar runs have been made in which the acid-carbonate complex was extracted with a polar solvent such as ethyl alcohol, dioxane, isopropyl alcohol, methyl ethyl ketone and the like. In these extractions I have found that the separation of the carbonate and the acid is substantially complete there being no evidence of contamination of either material with the other.

The residue from the filtration step of the process comprising the acid-carbonate complex, excess carbonate and any neutrals which may remain may, if exceptional purity is desired, be further treated prior to extraction or decomposition of the complex. This further refining may involve the washing of the filter cake with additional amounts of the light naptha solvents or if more stringent purification is desired the residue may be reslurried with fresh quantities of naptha and refiltered. This process may be repeated as many times as deemed feasible. In this regard I have found that the recovery of neutrals in a reslurrying operation amounts to only about one-twentieth the recovery in the initial separation and the recovery of neutrals in a second reslurrying amounts to about one-fortieth that of the initial stage.

Having described and illustrated the principles of my invention the essence of which resides in the purification of crude organic acids by formation therewith of a metal salt-acid complex as distinguished from a metal soap resulting in a more efficient separation of the neutral bodies from the acids and realizing that many modifications of my invention will occur to those skilled in the art without departing from the spirit and scope thereof, I claim:

1. A method of separating monocarboxylic organic acids having more than eight carbon atoms in the molecule from non-acidic organic materials which comprises contacting said acids in the absence of water and in the presence of a non-polar solvent with a metal carbonate capable of forming a recoverable complex with said acids, separating said complex from said non-acidic organic materials and non-polar solvent and recovering said acids from the separated complex.

2. A method of separating monocarboxylic organic acids having more than eight carbon atoms in the molecule from neutral materials of similar molecular weight which comprises contacting said acids in the absence of water and in the presence of a non-polar anhydrous solvent with an anhydrous metal carbonate capable of forming a recoverable complex with said acids, separating said complex from said neutral materials and non-polar solvent and recovering said acids from said complex by extraction with a polar solvent selected from the class of solvents consisting of alcohols, ketones and ethers.

3. A method of separating organic acids according to claim 2 wherein said anhydrous metal salt is an alkali metal carbonate.

4. A method of separating organic acids according to claim 2 wherein said anhydrous metal salt is sodium carbonate.

5. A method of separating monocarboxylic organic acids having more than eight carbon atoms in the molecule from neutral materials of similar molecular weight which comprises contacting said acids in the absence of water and in the presence of a non-polar anhydrous solvent with an anhydrous metal carbonate capable of forming a recoverable complex with said acids, separating said complex from said neutral materials, treating said complex with a dilute mineral acid to recover said organic acids from said complex.

6. A method of separating monocarboxylic organic acids having more than eight carbon atoms in the molecule from neutral materials of similar molecular weight which comprises contacting said acids in the absence of water and in the presence of a non-polar anhydrous solvent with an anhydrous metal carbonate capable of forming a recoverable complex with said acids, separating said complex from said neutral materials and converting said complex to a soap by saponification in hot aqueous solution.

ORVILLE L. POLLY.

REFERENCES CITED

The following references are of record in the file of this patent:

UNITED STATES PATENTS

| Number | Name | Date |
| --- | --- | --- |
| 1,492,717 | Lichtenthaeler | May 6, 1924 |
| 1,753,517 | James | Apr. 8, 1930 |
| 1,822,016 | Daniels | Sept. 8, 1931 |
| 1,858,151 | Gorhan | May 10, 1932 |
| 1,931,859 | Beller et al. | Oct. 24, 1933 |
| 1,943,427 | Franzen et al. | Jan. 16, 1934 |
| 2,073,054 | Franzen | Mar. 9, 1937 |
| 2,135,457 | Loder | Nov. 1, 1938 |
| 2,160,575 | Loder | May 30, 1939 |
| 2,186,975 | Isbell | Jan. 16, 1940 |